United States Patent
Olson et al.

(10) Patent No.: US 11,454,781 B2
(45) Date of Patent: *Sep. 27, 2022

(54) REAL-TIME AUTOFOCUS FOCUSING ALGORITHM

(71) Applicant: LEICA BIOSYSTEMS IMAGING, INC., Vista, CA (US)

(72) Inventors: Allen Olson, San Diego, CA (US); Kiran Saligrama, San Diego, CA (US); Yunlu Zou, San Diego, CA (US); Peyman Najmabadi, San Diego, CA (US)

(73) Assignee: Leica Biosystems Imaging, Inc., Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/085,962

(22) Filed: Oct. 30, 2020

(65) Prior Publication Data

US 2021/0048606 A1    Feb. 18, 2021

Related U.S. Application Data

(63) Continuation of application No. 16/601,355, filed on Oct. 14, 2019, now Pat. No. 10,823,936, which is a
(Continued)

(51) Int. Cl.
*G02B 7/38* (2021.01)
*G02B 21/02* (2006.01)
(Continued)

(52) U.S. Cl.
CPC ............... *G02B 7/38* (2013.01); *G02B 7/09* (2013.01); *G02B 21/02* (2013.01); *G02B 21/26* (2013.01);
(Continued)

(58) Field of Classification Search
CPC .. G02B 7/38; G02B 7/09; G02B 21/26; G02B 21/36; G02B 21/365; G02B 21/02;
(Continued)

(56) References Cited

U.S. PATENT DOCUMENTS

| | | | |
|---|---|---|---|
| 6,128,129 A | 10/2000 | Yoneyama | |
| 7,167,305 B2 | 1/2007 | Ogihara | |

(Continued)

FOREIGN PATENT DOCUMENTS

| | | | |
|---|---|---|---|
| CA | 3075287 A1 | 4/2019 | |
| CN | 102607921 A | 7/2012 | |

(Continued)

OTHER PUBLICATIONS

International Search Report and Written Opinion dated Nov. 30, 2018 for related International Application No. PCT/US2018/053629, in 13 pages.
(Continued)

*Primary Examiner* — Michael E Teitelbaum

(57) ABSTRACT

A digital scanning apparatus is provided that includes imaging and focusing sensors and a processor to analyze the image data captured by the imaging and focusing sensors and adjust the focus of the scanning apparatus in real time during a scanning operation. The individual pixels of the imaging sensor are all in the same image plane with respect to the optical path of the digital scanning apparatus. The individual pixels of the focusing sensor are each in a different image plane with respect to the optical path, and one pixel of the focusing sensor is on the same image plane as the image sensor. The processor analyzes image data from the imaging sensor and the focusing sensor and determines a distance and direction to adjust the relative position of an objective lens and a stage of the digital scanning apparatus to achieve optimal focus during the scanning operation.

20 Claims, 4 Drawing Sheets

Related U.S. Application Data continuation of application No. 16/147,448, filed on Sep. 28, 2018, now Pat. No. 10,459,193.

(60) Provisional application No. 62/566,145, filed on Sep. 29, 2017.

(51) Int. Cl.

| | | |
|---|---|---|
| *G02B 21/26* | (2006.01) | |
| *G02B 7/09* | (2021.01) | |
| *G02B 21/36* | (2006.01) | |
| *H04N 5/232* | (2006.01) | |

(52) U.S. Cl.
CPC ........... *G02B 21/36* (2013.01); *G02B 21/365* (2013.01); *H04N 5/232123* (2018.08)

(58) Field of Classification Search
CPC . G02B 1/244; G02B 21/245; H04N 5/232123
See application file for complete search history.

(56) References Cited

U.S. PATENT DOCUMENTS

| | | | |
|---|---|---|---|
| 7,262,908 | B2 | 8/2007 | Ogihara |
| 7,417,213 | B2 | 8/2008 | Krief et al. |
| 7,551,296 | B2 | 6/2009 | Boesser et al. |
| 7,638,748 | B2 | 12/2009 | Krief et al. |
| 7,822,249 | B2 | 10/2010 | Garty et al. |
| 7,898,673 | B2 | 3/2011 | Randers-Pehrson et al. |
| 8,143,562 | B2 | 3/2012 | Kawanabe |
| 8,619,264 | B2 | 12/2013 | Garty et al. |
| 8,643,835 | B2 | 2/2014 | Young et al. |
| 9,046,677 | B2 | 6/2015 | Tamura |
| 9,389,408 | B2 | 7/2016 | Hou et al. |
| 2005/0219518 | A1 | 10/2005 | Korngut et al. |
| 2009/0231689 | A1 | 9/2009 | Pittsyn et al. |
| 2010/0278378 | A1 | 11/2010 | Pigouche et al. |
| 2011/0001870 | A1 | 1/2011 | Yamamoto |
| 2011/0115897 | A1 | 5/2011 | Najmadadi et al. |
| 2012/0099852 | A1 | 4/2012 | Staker et al. |
| 2012/0312957 | A1 | 12/2012 | Loney et al. |
| 2013/0342673 | A1 | 12/2013 | Sticker et al. |
| 2013/0342750 | A1 | 12/2013 | Foote |
| 2014/0168404 | A1 | 6/2014 | Westphal et al. |
| 2014/0204196 | A1 | 7/2014 | Loney et al. |
| 2015/0109512 | A1 | 4/2015 | Oishi |
| 2015/0130920 | A1 | 5/2015 | Zou et al. |
| 2015/0153555 | A1 | 6/2015 | Loney et al. |
| 2015/0296126 | A1 | 10/2015 | Okugawa et al. |
| 2020/0218053 | A1 | 7/2020 | Zou et al. |

FOREIGN PATENT DOCUMENTS

| | | |
|---|---|---|
| CN | 102893198 A | 1/2013 |
| CN | 107111124 A | 8/2017 |
| CN | 111149037 A | 5/2020 |
| JP | 2002-365524 A | 12/2002 |
| JP | 2011-503565 A | 1/2011 |
| JP | 6985506 A | 12/2020 |
| KR | 10-2020-0041983 A | 4/2020 |
| WO | WO 2017/053891 A1 | 3/2017 |
| WO | WO 2019/068038 A1 | 4/2019 |

OTHER PUBLICATIONS

U.S. Appl. No. 16/601,355, filed Oct. 14, 2019, Pending.

U.S. Appl. No. 16/147,448, filed Sep. 28, 2018, U.S. Pat. No. 10,459,193.

Bravo-Zanoguera et al. "Dynamic autofocus for continuous-scanning time delay-and-intergration image acquisition in automated microscopy", Journal of Biomedical Optics, vol. 12, No. 3, Jun. 11, 2007.

Mao, "Design and optimization of automatic focusing system for microscope", Chinese excellent master's degree thesis fulitext database (Master's) Information Technology series), No. 5, May 15, 2006.

Wu et al., "A new method for evaluating image sharpness", Instrument and meter user, No. 3, Dec. 8, 2008.

Office Action in Canadian Application No. 3,075,287 dated May 3, 2021, in 6 pages.

Notice of Allowance in Canadian Application No. 3,075,287 dated Dec. 16, 2021, in 1 page.

Office Action in Chinese Application No. 201880062721.1 dated Jun. 2, 2021, in 18 pages.

Office Action in Chinese Application No. 201880062721.1 dated Jan. 30, 2022, in 14 pages.

Extended European Search Report for EP 18862682.4 dated Jan. 22, 2021 in 37 pages.

REAL-TIME AUTOFOCUS FOCUSING ALGORITHM

CROSS-REFERENCE TO RELATED APPLICATIONS

The present application is a continuation of U.S. patent application Ser. No. 16/601,355, filed on Oct. 14, 2019, which is a continuation of U.S. patent application Ser. No. 16/147,448, filed on Sep. 28, 2018 (now U.S. Pat. No. 10,459,193, issued on Oct. 29, 2019), which claims priority to U.S. Provisional Patent App. No. 62/566,145, filed on Sep. 29, 2017, which are all hereby incorporated herein by reference as if set forth in full.

BACKGROUND

Field of the Invention

The present disclosure generally relates to digital pathology, and more particularly relates to real-time autofocusing of a digital slide scanning apparatus.

Related Art

Digital pathology is an image-based information environment, which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine, in order to achieve even better, faster, and cheaper diagnosis, prognosis, and prediction of important diseases, such as cancer.

A primary objective for the digital pathology industry is to decrease the time needed to scan a glass slide. Some conventional digital scanning devices require at least 20 seconds of pre-scan processing to acquire focus points across the sample on a glass slide and create a focal surface from the acquired focus points. Therefore, what is needed is a system and method that overcomes these significant problems found in the conventional systems as described above.

SUMMARY

In an embodiment, the scanning apparatus includes an imaging sensor, a focusing sensor, and a processor configured to analyze the image data captured by the imaging sensor and the focusing sensor. The focusing sensor may be tilted such that a position along the optical path of the individual pixels of the focusing sensor vary for each line of image data that is captured, whereas the position along the optical path of the individual pixels of the imaging sensor are all substantially the same for each line of image data that is captured. However, when a line of image data is captured by both the imaging sensor and the focusing sensor, one pixel of the tilted focusing sensor is positioned within the same logical image plane along the optical path as all of the pixels of the imaging sensor. This state of having a common position within a logical image plane along the optical path is called "parfocal."

In an embodiment, during scanning, the processor is configured to analyze the image data from the imaging sensor and the focusing sensor to determine the distance and direction of the objective lens from its optimum focus position (i.e., the position of the objective lens at which the imaging plane of the imaging sensor coincides with the optimum focal plane). For each pixel of captured image data, the processor may determine a contrast value for the image data from the focusing sensor and a contrast value for the image data from the imaging sensor. The processor may then determine a ratio of the focusing sensor contrast value divided by the imaging sensor contrast value for each pixel. The processor may graph the contrast ratios to generate a contrast curve. The processor may then identify a peak of the contrast curve to determine the pixel having the highest contrast value. The parfocal point can also be plotted on the contrast curve. The parfocal point will be present on the contrast curve, since the pixel on the imaging sensor and the pixel on the focusing sensor that are within the same logical image plane with respect to the optical path will have substantially the same contrast values. The pixel distance (also referred to herein as "$\Delta X$") between the parfocal point on the contrast curve and the peak contrast point on the contrast curve indicates a physical distance along the optical path. This physical distance represents the distance between the current position of the objective lens and the optimum focus position of the objective lens (i.e., the position at which the optimum focal plane, along the optical path of the objective lens, will coincide with the individual pixels of the imaging sensor). The direction (also referred to herein as the "X direction" or indicated by either a positive or negative value for $\Delta X$) from the parfocal point to the highest contrast point, indicates the direction along the optical path in which the objective lens should be moved. It should be understood that, if the parfocal point is the same as the peak contrast point on the contrast curve (i.e., $\Delta X=0$), then the objective lens is already at the optimum focal position.

In an embodiment, the tilt of the focusing sensor is perpendicular to the scan direction of the scanning apparatus. This tilt is along the axis of the focusing sensor, which is also aligned with the imaging sensor. This geometry is advantageous for distinguishing between contrast variations due to tissue variability and focus, since a ratio method cancels out the tissue variation component and leaves only the contrast change due to focus.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for real-time autofocus during scanning of a specimen. In an embodiment, the real-time autofocus algorithm may be implemented in a digital pathology scanning apparatus to improve the operation of the processor-controlled apparatus. For example, one system disclosed herein provides a processor that is configured to analyze image data from the imaging sensor and the focusing sensor and determine a distance and direction, in which to adjust the relative position of an objective lens and/or a stage of the digital scanning apparatus, to achieve optimal focus during the scanning operation. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
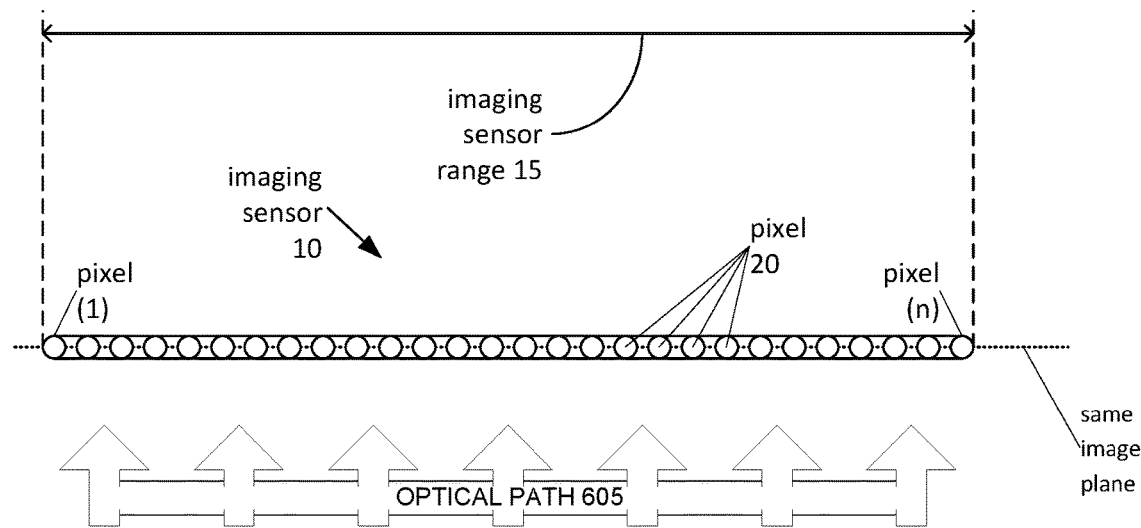
FIG. 1 is a bock diagram illustrating an example imaging sensor for real-time autofocus, according to an embodiment.

FIG. 1 is a bock diagram illustrating an example imaging sensor 10 for real-time autofocus, according to an embodiment. In the illustrated embodiment, the imaging sensor 10 comprises a plurality of pixels 20, which are configured to sense a field of view via the optical path 605. Each of the pixels 20 of the imaging sensor 10 are within substantially the same image plane with respect to the optical path 605. As used herein, an "image plane" is a plane that is orthogonal to the optical path 605.

The imaging sensor 10 can be any of a variety of sensor types (see, e.g., FIGS. 6A-6D) and can have a variety of lengths and a variety of numbers of pixels 20. In the illustrated embodiment, the imaging sensor 10 has N pixels that define a range 15 for the imaging sensor 10. The range 15 of imaging sensor 10 extends from pixel(1) at a first end to pixel(n) at a second end in a direction orthogonal to the optical path 605, and, in an embodiment, orthogonal to the scanning direction. In an embodiment, the range 15 of the imaging sensor 10 can be about 43 millimeters. However, other embodiments may have other ranges, for example, from 5 millimeters to 95 millimeters.

Figure 2:
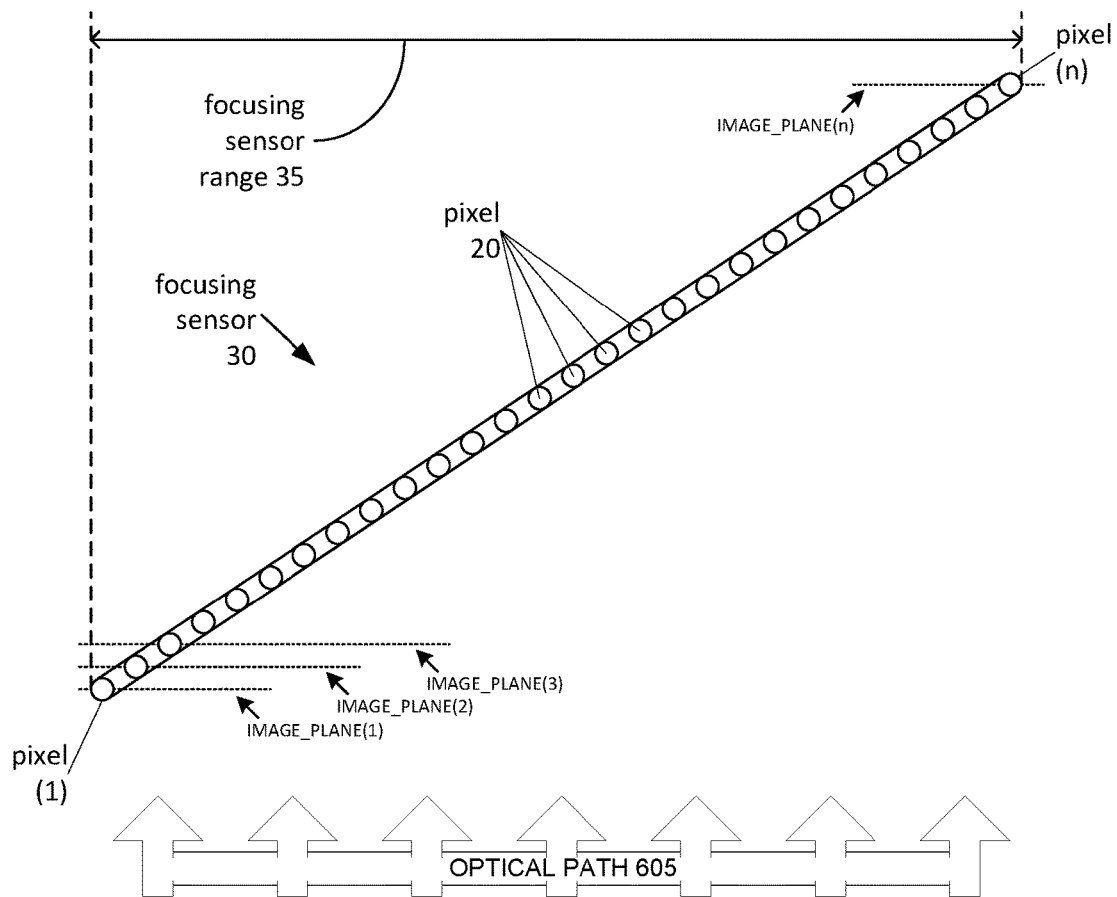
FIG. 2 is a bock diagram illustrating an example focusing sensor for real-time autofocus, according to an embodiment.

FIG. 2 is a bock diagram illustrating an example focusing sensor 30 for real-time autofocus, according to an embodiment. In the illustrated embodiment, similarly to the imaging sensor 10, the focusing sensor 30 comprises a plurality of pixels 20. However, unlike the pixels in the imaging sensor 10, each pixel 20 of the focusing sensor 30 is in a different image plane than any other pixel 20 of the focusing sensor 30.

The focusing sensor 30 can be any of a variety of sensor types (see, e.g., FIGS. 6A-6D) and can have a variety of lengths and a variety of numbers of pixels 20. In the illustrated embodiment, the focusing sensor 30 has N pixels that define a range 35 for the focusing sensor 30. The range 35 of focusing sensor 30 extends from pixel(1) at a first end to pixel(n) at a second end in a direction perpendicular to the scanning direction. In an embodiment, the range 35 of the focusing sensor 30 can be about 43 millimeters. However, other embodiments may have other ranges, for example, from 5 millimeters to 95 millimeters.

Figure 3:
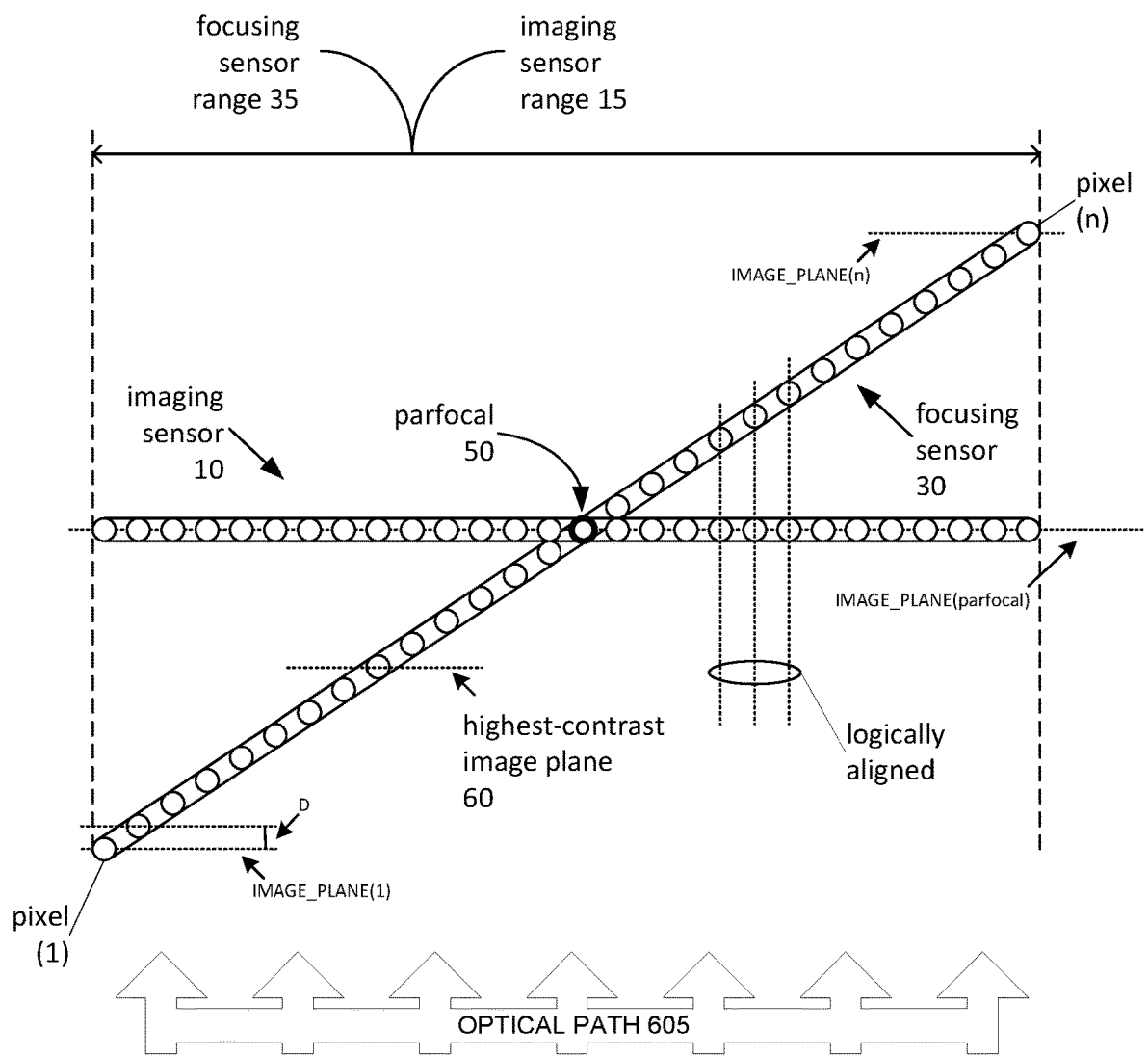
FIG. 3 is a bock diagram illustrating an example logical arrangement of an imaging sensor and a focusing sensor for real-time autofocus, according to an embodiment.

FIG. 3 is a bock diagram illustrating an example logical arrangement of an imaging sensor 10 and a focusing sensor 30 for real-time autofocus, according to an embodiment. In the illustrated embodiment, the imaging sensor 10 and the focusing sensor 30 are positioned with respect to the optical path 605 such that the range 15 of the imaging sensor 10 and the range 35 of the focusing sensor 30 are logically the same. Furthermore, the imaging sensor 10 and the focusing sensor 30 are also positioned such that they have the same logical field of view of a sample 590 being scanned.

Additionally, in an embodiment, the imaging sensor 10 and the focusing sensor 30 are positioned such that the individual pixels 20 of the imaging sensor 10 are logically aligned with the individual pixels 20 of the focusing sensor 30 with respect to the optical path. In other words, each individual pixel 20 of the imaging sensor 10 may be paired with a corresponding individual pixel 20 of the focusing sensor 30, and both pixels in the pair are logically aligned with an optical path 605 such that they have the same logical field of view of the sample 590. Alternatively, segments of two or more pixels 20 of the focusing sensor 30 may be logically aligned with corresponding segments of two or more pixels 20 of the imaging sensor 10, and the pairs of focusing-sensor and imaging-sensor segments may contain the same number or different numbers of pixels 20.

Alternatively, in an embodiment, the imaging sensor 10 and the focusing sensor 30 are positioned such that at least a portion of the individual pixels 20 of the imaging sensor 10 are offset from the individual pixels 20 of the focusing sensor 30, with respect to the optical path 605, such that the various individual pixels 20 of the imaging sensor 10 may or may not have the same logical field of view of the sample 590 as their corresponding pixels 20 of the focusing sensor 30. In such an alternative embodiment, the imaging sensor 10 and the focusing sensor 30 may be positioned such that the individual pixels 20 of the imaging sensor 10 and the focusing sensor 30 are not logically aligned in the optical path 605. For example, the individual pixels 20 of the focusing sensor 30 may be partially or completely logically offset from the individual pixels 20 of the imaging sensor 10 with respect to the optical path 605. Some pixels 20 of the focusing sensor 30 may be logically aligned with corresponding pixels 20 of the imaging sensor 10 with respect to the optical path 605, while other pixels 20 of the focusing sensor 30 may be partially logically offset from corresponding pixels 20 of the imaging sensor 10 with respect to the optical path 605, and while still other pixels 20 of the focusing sensor 30 may be completely logically offset from corresponding pixels 20 of the imaging sensor 10 with respect to the optical path 605. Additionally, the range 35 of the focusing sensor 30 may be less than or greater than the range 15 of the imaging sensor 10.

In the illustrated embodiment, the imaging sensor 10 and the focusing sensor 30 are positioned with respect to the optical path 605, such that the image plane of one pixel of the focusing sensor 30 at parfocal point 50 on the focusing sensor 30 is logically aligned with the image plane of the imaging sensor 10. This arrangement defines a parfocal image plane with respect to the optical path 605. Importantly, the parfocal image plane provides a common frame of reference, with respect to the optical path 605, for image data captured by the imaging sensor 10 and the focusing sensor 30. For example, when a single field of view of image data is captured by both the imaging sensor 10 and the focusing sensor 30, the contrast value for the focusing sensor pixel that is at the parfocal point 50 (i.e., within a parfocal image plane) will be similar to the contrast value for the imaging sensor 10. Moreover, if the individual pixels 20 of the focusing sensor 30 are each logically aligned with a corresponding individual pixel 20 of the imaging sensor 30, the contrast value for the pixel 20 of focusing sensor 30 that is at the parfocal point 50 will be substantially the same as the contrast value for the corresponding pixel 20 in imaging sensor 10 that is logically aligned with that parfocal focusing-sensor pixel.

For each single field of view of image data that is captured by the focusing sensor 30, a single pixel within a single image plane will have the highest contrast. For purposes of illustration, it is assumed that image plane 60 is this single image plane with the highest contrast. However, it should be understood that this is simply an example. In actuality, the image plane with the highest contrast for a particular field of view within the sensor range 35 could be any image plane from image_plane(1) to image_plane(n) (e.g., including image_plane(parfocal)).

Similarly, for each contiguous set of fields of view of image data that is captured by the focusing sensor 30, a single image plane (e.g., illustrated as image plane 60 for ease of explanation) will have the highest average contrast. In an embodiment, a contiguous set of fields of view may include 1,000 fields of view, with each individual field of view representing a single scan line. The set of fields of view may be referred to herein as a "buffer." The term "buffer" is not tied to any specific number of scan lines or any specific physical memory segment, and therefore, the size of a buffer can vary in accordance with physical memory segments or the speed of the scanning apparatus, where speed can be defined by stage speed or by image data capture speed.

While embodiments are primarily described herein as calculating the contrast value for a particular pixel, it should be understood that, instead, the contrast value can be calculated for a column of pixels whose image data has been stored in the buffer. Specifically, each pixel 20 in the imaging sensor 10 and the focusing sensor 30 may represent a column of pixels within the same plane as that pixel and orthogonal to illustrated ranges 15 and 35 (e.g., extending into or out of the page in FIGS. 1-3). In this case, the contrast value for a column may be calculated as an average of the contrast values for all of the pixels in the column. The contrast values for each column of imaging-sensor and focusing-sensor pixels, intersecting ranges 15 and 35, respectively, can then be used to calculate the ratios described herein, in place of the contrast values for individual pixels across ranges 15 and 35.

More generally, the contrast values for the imaging sensor 10 may be represented as a first vector of contrast values, and the contrast values for the focusing sensor 30 may be represented as a second vector of contrast values. Each value within each of the first and second vectors may represent the contrast value for a single pixel, the contrast value (e.g., average contrast value) for a column of pixels, or the contrast value (e.g., average contrast value) for any segment of pixels. However, in each case, each contrast value in the first vector represents a position of a segment of one or more imaging-sensor pixels 20 across range 15, each contrast value in the second vector represents a position of a segment of one or more focusing-sensor pixels 20 across range 35, and each contrast value in the first vector corresponds to a contrast value at a corresponding position in the second vector.

Figure 4:
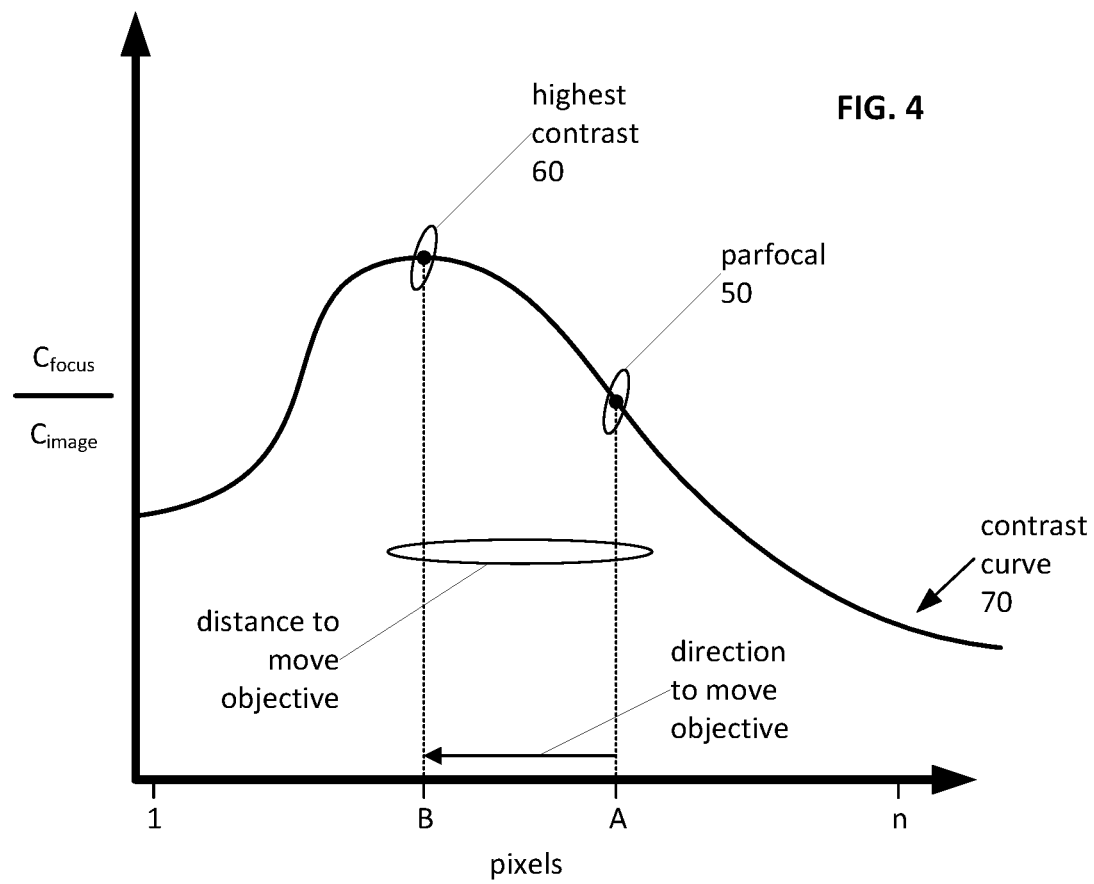
FIG. 4 is a graph diagram illustrating an example contrast curve of image data from an imaging sensor and a focusing sensor, according to an embodiment.

FIG. 4 is a graph diagram illustrating an example contrast curve 70 for image data from each of an imaging sensor 10 and a focusing sensor 30, according to an embodiment. The contrast curve 70 can be calculated for a single scan line of image data or for a single buffer of image data. In operation, when corresponding image data is captured by the imaging sensor 10 and the focusing sensor 30, the raw intensity value provided by each pixel of the imaging sensor 10 and the focusing sensor 30 is used to calculate a contrast value for each pixel, column, or other segment of the imaging sensor 10 and the focusing sensor 30. Subsequently, a ratio of the contrast values of corresponding positions (e.g., pixels, columns, or other segments) on the imaging sensor 10 and the focusing sensor 30 is determined by dividing the contrast value of each imaging-sensor position into the contrast value of its corresponding focusing-sensor position (e.g., dividing each of the contrast values in the second vector by its corresponding contrast value in the first vector). The resulting ratio values can be plotted on a graph against the corresponding positions (e.g., pixel numbers in FIG. 4) to generate the contrast curve 70.

Advantageously, because of the previously described logical arrangement of the imaging sensor 10 and the focusing sensor 30, by which each position (e.g., individual pixel) of the imaging sensor 10 is logically aligned with a corresponding position (e.g., individual pixel) of the focusing sensor 30, the parfocal point 50 will fall on the contrast curve 70. This is because the position (e.g., individual pixel) on the focusing sensor 30, that is within the same logical image plane as the imaging sensor 10, is known or can be determined. Additionally, the ratio of the contrast value of the focusing-sensor position (e.g., pixel) at the parfocal point 50 to the contrast value of the corresponding imaging-sensor positioned (e.g., the imaging-sensor pixel with which the focusing-sensor pixel is logically aligned) will be substantially one, since these two pixels will have substantially the same contrast values.

In addition to having the parfocal point 50, the contrast curve 70 also has a peak that represents the highest-contrast point 60. The highest-contrast point 60 represents the best focus for the single scan line or the single buffer. Because the parfocal point 50 represents the image plane of the imaging sensor 10, if the highest-contrast point 60 is not the same as the parfocal point 50, the focus of the imaging sensor 10 is not at its optimum. Accordingly, the distance between the parfocal point 50 and the highest-contrast point 60, along the pixel axis of the contrast curve 70 (i.e., the X-axis illustrated in FIG. 4), represents the distance that the objective lens should be adjusted to achieve optimum focus. Similarly, the direction from the parfocal point 50 to the highest contrast point 60, along the pixel axis, represents the direction that the objective lens should be adjusted within the optical path to achieve optimum focus.

For example, if the parfocal point 50 is at position A (e.g., a particular pixel) and the highest-contrast point 60 is at position B (e.g., a particular pixel), along the X-axis, then the distance to move the objective lens to achieve optimal focus can be represented by $\Delta X=|A-B|$. Similarly, if the direction from the parfocal point 50 at position A toward the highest-contrast point 60 at position B, along the X-axis, is negative, then the direction to move the objective lens 600 in the optical path 605 may be determined to be toward the sample 590 (i.e., decrease the distance between the objective lens and the sample). On the other hand, if this direction is positive, then the direction to move the objective lens 600 in the optical path 605 may be determined to be away from the sample 590 (i.e., increase the distance between the objective lens and the sample).

In one embodiment, the value of $\Delta X$ can be multiplied by the physical distance D (e.g., in microns), along the optical path 605, between individual pixels of the focusing sensor 30, to arrive at a physical distance. The resulting product represents a physical distance which can be converted into an instruction to a positioning system (e.g., objective lens positioner 630) that controls the relative distance between the objective lens 600 and the sample 590 on the stage 580. The instruction can be provided to the positioning system to make an appropriate adjustment of the relative distance between the objective lens 600 and the sample 590 on the stage 580.

Figure 5:
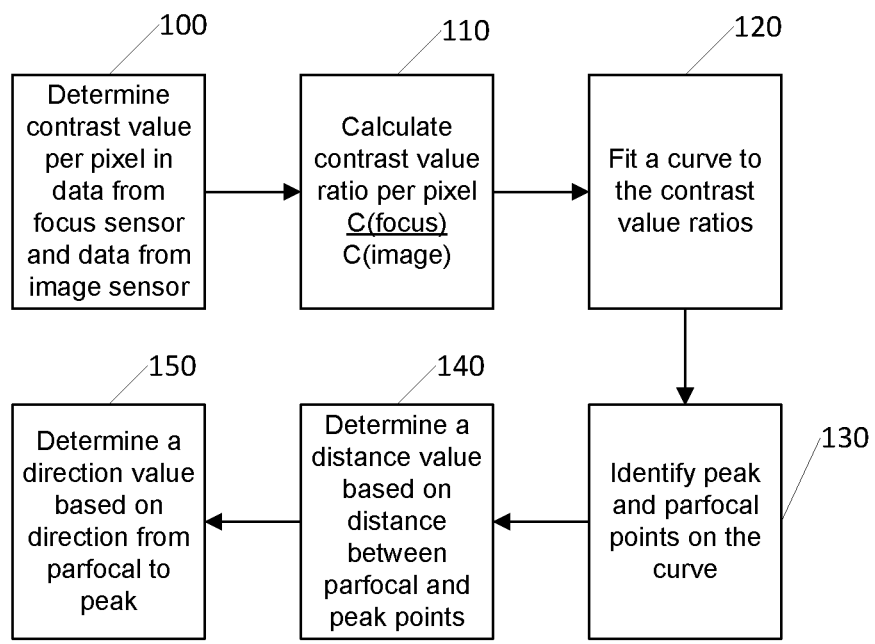
FIG. 5 is a flow diagram illustrating an example process for determining a distance and direction for an objective lens adjustment for real-time autofocus, according to an embodiment.

FIG. 5 is a flow diagram illustrating an example process for determining a distance and direction for an objective lens adjustment for real-time autofocus, according to an embodiment. The illustrated process can be carried out by a digital scanning apparatus system, such as those described with respect to FIGS. 1-3 and 6A-6D. For simplicity, the process is described with respect to determining contrast values for individual pixels. However, as discussed above, the process may be generalized to determine contrast values (e.g., average contrast values) for columns or other segments of multiple pixels.

Initially, in step 100, the system determines a contrast value for each pixel of image data (i.e., intensity values) received from an imaging sensor 10 and a focusing sensor 30, wherein at least a portion of the individual pixels of the imaging sensor 10 and the focusing sensor 30 correspond to each other in a logical arrangement with respect to the optical path 605 (i.e., correspond to the same portion of the field of view). Next, in step 110, the system calculates a ratio of contrast values for each pair of corresponding pixels, with the contrast value of the pixel from the focusing sensor as the numerator and the contrast value of the pixel from the imaging sensor as the denominator.

Next, in step 120, the system generates a representation of a curve of the contrast-value ratios, calculated in step 110, with the contrast-value ratio values represented by the Y-axis and the pixel numbers of the corresponding pixel pairs of the imaging and focusing sensors represented by the X-axis. In an embodiment, each of the pixels of the imaging sensor 10 has a corresponding pixel of the focusing sensor 30 that is in logical alignment along the optical path 605. Additionally or alternatively, each of the pixels of the focusing sensor 30 has a corresponding pixel of the imaging sensor 10 that is in logical alignment along the optical path 605. In an embodiment, there is a one-to-one logical alignment between each pixel of the imaging sensor 10 and a corresponding pixel of the focusing sensor 30, such that each pixel of both sensors is logically paired (i.e., shares a common field of view within the optical path 605) with exactly one corresponding pixel on the other sensor.

After the curve has been fit to the contrast-value ratios, in step 130, the system identifies a peak point 60 and a parfocal point 50 on the curve of the contrast-value ratios. Then, in step 140, the system calculates a distance value between the parfocal point 50 and the peak point 60. It should be understood that this distance value could be zero, if the parfocal point 50 and the peak point 60 turn out to be one in the same. In addition, in step 150, the system determines a direction value from the parfocal point 50 to the peak point 60. It should be understood that, in an actual implementation, steps 140 and 150 may be combined by simply subtracting the peak point 60 from the parfocal point 50. This will result in either a value of zero (i.e., the peak point 60 is the same as the parfocal point 50), a negative value (i.e., the peak point 60 is at a greater pixel number than the parfocal point 50) which indicates a first direction, or a positive value (i.e., the peak point 60 is at a lower pixel number than the parfocal point 50) which indicates a second direction that is opposite to the first direction.

In an embodiment, the system converts the distance value, calculated in step 140, into a physical distance to move the objective lens, and converts the direction value, determined in step 150, into a physical direction in which to move the objective lens along the optical path. Advantageously, the system may use the physical distance and physical direction to generate an objective lens adjustment instruction, which the system can then provide to a positioning system (e.g., objective lens positioner 630) to adjust the relative position of the objective lens 600 with respect to the sample 590 to achieve optimum focus.

Figure 6A:
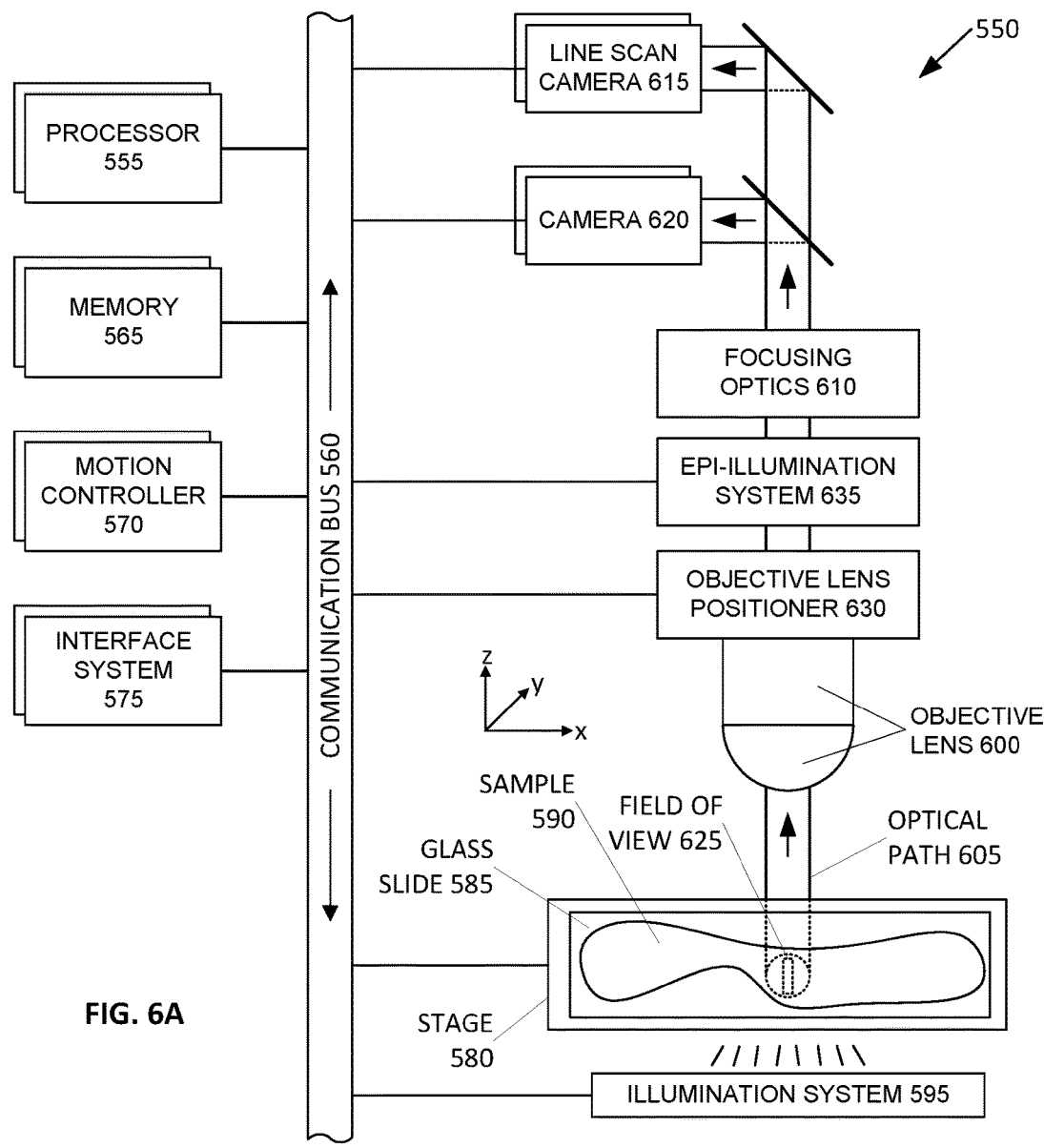
FIG. 6A is a block diagram illustrating an example processor-enabled device that may be used in connection with various embodiments described herein.

FIG. 6A is a block diagram illustrating an example processor-enabled device 550 that may be used in connection with various embodiments described herein. Alternative forms of the device 550 may also be used, as will be understood by the skilled artisan. In the illustrated embodiment, the device 550 is presented as a digital imaging device (also referred to as a scanner system, scanning system, scanning apparatus, digital scanning apparatus, digital slide scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample 590, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615, and/or one or more additional cameras 620 (e.g., a line scan camera or an area scan camera), which each define a separate field of view 625 on the sample 590 and/or glass slide 585. The various elements of the scanner system 550 are communicatively coupled via one or more communication busses 560. Although there may be one or more of each of the various elements of the scanner system 550, for the sake of simplicity, these elements are described herein in the singular, except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multicore processor capable of processing instructions in parallel. Additional separate processors may also be provided to control particular components or perform particular functions, such as image processing. For example, additional processors may include an auxiliary processor to manage data input, an auxiliary processor to perform floating point mathematical operations, a specialpurpose processor having an architecture suitable for fast execution of signal-processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, for example, a random access memory, a read only memory, a hard disk drive, removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and/or the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected to the scanning system 550 (e.g., a printer, removable storage medium, etc.) or remote devices such as an image server system, an operator station, a user station, and/or an administrative server system that are connected to the scanner system 550 via a network (not shown).

The illumination system 595 is configured to illuminate at least a portion of the sample 590. The illumination system may include, for example, a light source and illumination optics. The light source could be a variable-intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or camera 620 sense optical energy that is transmitted through the sample 590. Alternatively, or in combination, the illumination system 595 may also be configured to illuminate the sample 590 in reflection mode such that the line scan camera 615 and/or camera 620 sense optical energy that is reflected from the sample 590. In any case, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon-sensitive molecules that can absorb light at a specific wavelength (excitation). These photon-sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615, that includes multiple linear sensor arrays (e.g., a time delay integration ("TDI") line scan camera), increases the sensitivity to light of the line scan camera 615 by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample 590. As will be understood by those skilled in the art, a fluorescence sample 590 can be labeled with multiple florescence dyes that emit light at different wavelengths, which are also referred to as "channels."

Furthermore, because the low-end and high-end signal levels of various fluorescence samples present a wide spectrum of wavelengths for the line scan camera 615 to sense, it is desirable for these low-end and high-end signal levels, which the line scan camera 615 can sense, to be similarly wide. Accordingly, in a fluorescence scanner embodiment, a line scan camera 615 used in the fluorescence scanning system 550 is a monochrome 10-bit 64-linear-array TDI line scan camera. However, it should be understood that a variety of bit depths for the line scan camera 615 can be employed for use with a fluorescence scanner embodiment of the scanning system 550.

The movable stage 580 is configured for precise XY movement (i.e., movement in two directions within the plane of the movable stage 580) under control of the processor 555 or the motion controller 570. The movable stage 580 may also be configured for Z movement (i.e., movement in a direction orthogonal to the plane of the movable stage 580) under control of the processor 555 or the motion controller 570. The moveable stage 580 is configured to position the sample 590 in a desired location during image data capture by the line scan camera 615 and/or the area scan camera 620. The moveable stage 580 is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated XY grid to aid in the location of the sample 590 on the movable stage 580. The movable stage 580 may be a linear-motor-based XY stage with high precision encoders employed on both the X and the Y axis. For example, very precise nanometer encoders can be used on the axis in the scanning direction, and on the axis that is in the direction perpendicular to the scanning direction and within the same plane as the scanning direction. The stage 580 is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, and machined parts.

Objective lens 600 is mounted on the objective lens positioner 630, which may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed-loop manner using motion controller 570, under the control of the processor 555 that employs memory 565 for storing information and instructions, including the computer-executable programmed steps for overall operation of the scanning system 550.

In an embodiment, the objective lens 600 is a plan apochromatic ("APO") infinity-corrected objective with a numerical aperture corresponding to the highest spatial resolution desirable, where the objective lens 600 is suitable for transmission-mode illumination microscopy, reflection-mode illumination microscopy, and/or epi-illumination-mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity-corrected, focusing optics 610 can be placed in the optical path 605 above the objective lens 600, where the light beam passing through the objective lens becomes a collimated light beam. The focusing optics 610 focus the optical signal captured by the objective lens 600 onto the light-responsive elements of the line scan camera 615 and/or the camera 620, and may include optical components such as filters, magnification changer lenses, and/or the like. The objective lens 600, combined with the focusing optics 610, provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a three-linear-array ("red-green-blue" or "RGB") color line scan camera or a 96 linear array monochrome TDI may be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555, and the revised contiguous digital image can also be stored in the memory 565.

In an embodiment with two or more line scan cameras 615, at least one of the line scan cameras 615 can be configured to function as the focusing sensor 30 that operates in combination with at least one of the line scan cameras 615 that is configured to function as the imaging sensor 10. The focusing sensor 30 can be logically positioned on the same optical axis as the imaging sensor 10 or the focusing sensor 30 may be logically positioned before or after the imaging sensor 10 with respect to the scanning direction of the scanner system 550. In such an embodiment, with at least one line scan camera 615 functioning as the focusing sensor 30, the image data generated by the focusing sensor 30 is stored in a portion of the memory 565 and processed by the one or more processors 555 to generate focus information to allow the scanner system 550 to adjust the relative distance between the sample 590 and the objective lens 600 to maintain focus on the sample 590 during scanning. Additionally, in an embodiment, the at least one line scan camera 615, functioning as the focusing sensor 30, may be oriented such that each of a plurality of individual pixels of the focusing sensor 30 is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion of the sample 590 or the entire sample 590. The scanning of the sample 590 may include acquiring vertical image stripes or horizontal image stripes. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image stripes be acquired in an adjacent or contiguous manner. The resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550, either directly or indirectly, for example, via a network (not shown).

Figure 6B:
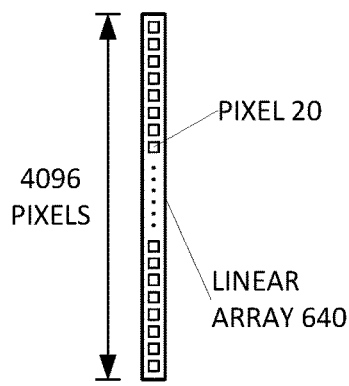
FIG. 6B is a block diagram illustrating an example line scan camera having a single linear array that may be used in connection with embodiments described herein.

FIG. 6B illustrates a line scan camera having a single linear array 640, which may be implemented as a charge coupled device ("CCD") array. The single linear array 640 comprises a plurality of individual pixels 20. In the illustrated embodiment, the single linear array 640 has 4096 pixels. In alternative embodiments, linear array 640 may have more or fewer pixels. For example, common formats of linear arrays include 512, 1024, and 4096 pixels. The pixels 20 are arranged in a linear fashion to define a field of view 625 for the linear array 640. The size of the field of view 625 varies in accordance with the magnification of the scanner system 550.

Figure 6C:
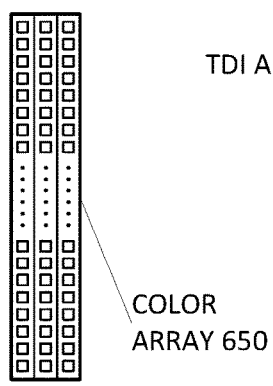
FIG. 6C is a block diagram illustrating an example line scan camera having three linear arrays that may be used in connection with embodiments described herein.

FIG. 6C illustrates a line scan camera having three linear arrays, each of which may be implemented as a CCD array. The three linear arrays combine to form a color array 650. In an embodiment, each individual linear array in the color array 650 detects a different color intensity, for example red, green, or blue. The color image data from each individual linear array in the color array 650 is combined to form a single field of view 625 of color image data.

Figure 6D:
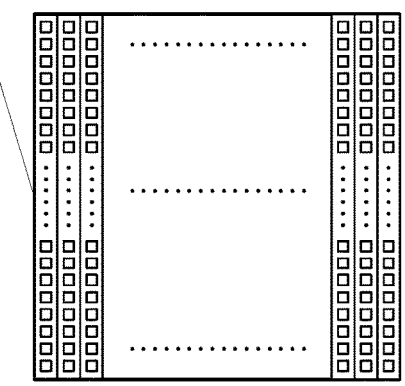
FIG. 6D is a block diagram illustrating an example line scan camera having a plurality of linear arrays that may be used in connection with embodiments described herein.

FIG. 6D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method performed by at least one processor of a digital scanning apparatus, the method comprising:
    receiving image data from a plurality of imaging-sensor pixels of an imaging sensor, the imaging sensor configured to capture image data via an optical path defined by an objective lens;
    receiving image data from a plurality of focusing-sensor pixels of a focusing sensor, the focusing-sensor pixels located in different image planes, and the focusing sensor configured to capture image data via the optical path;
    calculating a ratio for a plurality of pairs of positions on the imaging sensor and the focusing sensor that are aligned along the optical path and sense a same field of view; and
    adjusting a distance between the objective lens and a sample, during scanning of the sample, based on the calculated ratios.

2. The method of claim 1, wherein the imaging sensor and the focusing sensor have an equal number of pixels.

3. A digital scanning apparatus comprising:
    an objective lens positioned for viewing a portion of a sample, wherein the objective lens defines an optical path;
    an imaging sensor comprising a plurality of imaging-sensor pixels configured to capture image data via the optical path;
    a focusing sensor comprising a plurality of focusing-sensor pixels located in different image planes and configured to capture image data via the optical path; and
    a processor configured to:
        receive image data from the plurality of imaging-sensor pixels of the imaging sensor,
        receive image data from the plurality of focusing-sensor pixels of the focusing sensor,
        calculate a ratio for a plurality of pairs of positions on the imaging sensor and the focusing sensor that are aligned along the optical path and sense a same field of view, and
        adjust a distance between the objective lens and the sample, during scanning of the sample, based on the calculated ratios.

4. A non-transitory computer-readable medium having instructions stored thereon, wherein the instructions, when executed by a processor of a digital scanning apparatus configured to scan a sample, cause the processor to:
    receive image data from a plurality of imaging-sensor pixels of an imaging sensor, the imaging sensor configured to capture image data via an optical path defined by an objective lens;
    receive image data from a plurality of focusing-sensor pixels of a focusing sensor, the focusing-sensor pixels located in different image planes, and the focusing sensor configured to capture image data via the optical path;

calculate a ratio for a plurality of pairs of positions on the imaging sensor and the focusing sensor that are aligned along the optical path and sense a same field of view; and adjust a distance between the objective lens and the sample, during scanning of the sample, based on the calculated ratios.

5. The apparatus of claim 3, wherein the imaging sensor and the focusing sensor have an equal number of pixels, and wherein each of the imaging-sensor pixels is logically aligned, along the optical path, with exactly one of the focusing-sensor pixels.

6. The apparatus of claim 3, wherein each position on the imaging sensor corresponds to a single one of the plurality of imaging-sensor pixels, and wherein each position on the focusing sensor corresponds to a single one of the plurality of focusing-sensor pixels.

7. The apparatus of claim 6, wherein, for each of the plurality of pairs of positions, wherein the processor is further configured to:
 determine a first contrast value for the single imaging-sensor pixel corresponding to the position on the imaging sensor,
 determine a second contrast value for the single focusing-sensor pixel corresponding to the position on the focusing sensor, and
 calculate the ratio based on the first contrast value and the second contrast value.

8. The apparatus of claim 3, wherein each position on the imaging sensor corresponds to a segment of two or more of the plurality of imaging-sensor pixels, and wherein each position on the focusing sensor corresponds to a segment of two or more of the plurality of focusing-sensor pixels.

9. The apparatus of claim 8, wherein, for each of the plurality of pairs of positions, wherein the processor is further configured to:
 determine a first average contrast value for the segment corresponding to the position on the imaging sensor,
 determine a second average contrast value for the segment corresponding to the position on the focusing sensor, and
 calculate the ratio based on the first average contrast value and the second average contrast value.

10. The apparatus of claim 8, wherein the image data from the plurality of imaging-sensor pixels comprises a plurality of columns, wherein the image data from the plurality of focusing-sensor pixels comprises a plurality of columns, wherein each segment of two or more imaging-sensor pixels comprises one of the plurality of columns in the image data from the plurality of imaging-sensor pixels, and wherein each segment of two or more focusing-sensor pixels comprises one of the plurality of columns in the image data from the plurality of focusing sensor pixels, wherein, for each of the plurality of pairs of positions, the processor is configured to:
 determine a first average contrast value for the column corresponding to the position on the imaging sensor,
 determine a second average contrast value for the column corresponding to the position on the focusing sensor, and
 calculate the ratio based on the first average contrast value and the second average contrast value.

11. The apparatus of claim 3, wherein the adjustment of the distance between the objective lens and the sample is based on:
 converting a distance, in the calculated ratios, between a peak value and a parfocal value, for a parfocal point between the imaging sensor and the focusing sensor, into a physical distance,
 converting a direction between the peak value and the parfocal value into a physical direction along the optical path, and
 changing the distance between the objective lens and the sample by the physical distance in the physical direction,
 wherein the conversion of the distance between the peak value and the parfocal value into a physical distance is based on multiplying a number of focusing-sensor pixels, spanning the distance between the peak value and the parfocal value, by a physical distance between adjacent focusing-sensor pixels.

12. The apparatus of claim 3, wherein the optical path comprises a first optical path between the objective lens and the imaging sensor, and a second optical path between the objective lens and the focusing sensor.

13. The apparatus of claim 3, wherein the focusing sensor is logically tilted in a direction that is perpendicular to a scan direction of the digital scanning apparatus.

14. The apparatus of claim 3, wherein a range of the imaging sensor and the focusing sensor is identical, and wherein the range is between 5 and 95 millimeters.

15. The apparatus of claim 3, wherein the image data from the plurality of imaging sensor pixels and the plurality of focusing-sensor pixels comprise intensity values.

16. The non-transitory computer-readable medium of claim 4, wherein the imaging sensor and the focusing sensor have an equal number of pixels, and wherein each of the imaging-sensor pixels is logically aligned, along the optical path, with exactly one of the focusing-sensor pixels.

17. The non-transitory computer-readable medium of claim 4, wherein, for each of the plurality of pairs of positions, the calculation of the ratio is based on:
 calculating a first contrast value for the single imaging-sensor pixel corresponding to the position on the imaging sensor,
 calculating a second contrast value for the single focusing-sensor pixel corresponding to the position on the focusing sensor, and
 calculating the ratio based on the first contrast value and the second contrast value.

18. The non-transitory computer-readable medium of claim 4, wherein the adjustment of the distance between the objective lens and the sample is based on:
 converting a distance, in the calculated ratios, between a peak value and a parfocal value, for a parfocal point between the imaging sensor and the focusing sensor, into a physical distance,
 converting a direction between the peak value and the parfocal value into a physical direction along the optical path, and
 changing the distance between the objective lens and the sample by the physical distance in the physical direction,
 wherein the conversion of the distance between the peak value and the parfocal value into a physical distance is based on multiplying a number of focusing-sensor pixels, spanning the distance between the peak value and the parfocal value, by a physical distance between adjacent focusing-sensor pixels.

19. The non-transitory computer-readable medium of claim 4, wherein the focusing sensor is logically tilted in a direction that is perpendicular to a scan direction of the digital scanning apparatus.

20. The non-transitory computer-readable medium of claim 4, wherein the optical path comprises a first optical path between the objective lens and the imaging sensor, and a second optical path between the objective lens and the focusing sensor.

* * * * *